United States Patent
Hegwein et al.

(10) Patent No.: US 12,152,421 B2
(45) Date of Patent: Nov. 26, 2024

(54) ACTUATING MECHANISM TO ACTUATE A LOADING OR FUEL FILLER FLAP

(71) Applicant: ILLINOIS TOOL WORKS INC., Glenview, IL (US)

(72) Inventors: Matthias Hegwein, Ippesheim (DE); Joachim Oberst, Grossrinderfeld (DE); Maximiliane Merkert, Ahorn Eubigheim (DE); Stefan Kämmer, Gaukonigshofen (DE); Günter Hins, Würzburg (DE); Roland Och, Rottendorf (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 259 days.

(21) Appl. No.: 17/691,354

(22) Filed: Mar. 10, 2022

(65) Prior Publication Data

US 2022/0290476 A1 Sep. 15, 2022

(30) Foreign Application Priority Data

Mar. 12, 2021 (DE) ...................... 10 2021 106 137.7

(51) Int. Cl.
*E05C 3/30* (2006.01)
*B60K 15/05* (2006.01)
(Continued)

(52) U.S. Cl.
CPC ................ *E05C 3/30* (2013.01); *B60K 15/05* (2013.01); *B60L 53/35* (2019.02); *E05C 3/004* (2013.01);
(Continued)

(58) Field of Classification Search
CPC ... E05C 3/00; E05C 3/004; E05C 3/16; E05C 3/122; E05C 3/162; E05C 3/167;
(Continued)

(56) References Cited

U.S. PATENT DOCUMENTS

| 2011/0174102 A1* | 7/2011 | Beck | ..................... E05C 19/022 74/110 |
| 2012/0222356 A1* | 9/2012 | Beck | ..................... B60K 15/05 49/348 |

(Continued)

FOREIGN PATENT DOCUMENTS

| DE | 102004010294 A1 * | 9/2005 | ............. B60K 15/04 |
| DE | 102008057933 B4 | 7/2010 | |

(Continued)

*Primary Examiner* — Nathan Cumar
(74) *Attorney, Agent, or Firm* — THOMPSON HINE LLP (57) ABSTRACT

An actuating mechanism for actuating a charging or fueling flap on a charging or fueling compartment received on or in a body component of a vehicle, wherein the charging or fueling flap is reversibly movable between a closed position and an open position, wherein a flap lock is provided for locking the charging or fueling flap in its closed position. The actuating mechanism includes a drive having a drive shaft, which is operatively connectable to the charging or fueling flap such that, upon rotation of the drive shaft, the charging or fueling flap is movable relative to the charging or fueling compartment. The actuating mechanism further includes a mechanical control or switching mechanism, which is configured such that, upon rotation of the drive shaft to manipulate the flap lock, a rotational movement of the drive shaft can be tapped with the aid of the mechanical control or switching mechanism.

16 Claims, 6 Drawing Sheets

(51) Int. Cl.
*B60L 53/35* (2019.01)
*E05C 3/00* (2006.01)
*E05C 3/16* (2006.01)

(52) U.S. Cl.
CPC ...... *E05C 3/162* (2013.01); *B60K 2015/0515* (2013.01); *B60K 2015/0561* (2013.01)

(58) Field of Classification Search
CPC ... E05C 3/165; E05C 3/30; E05C 3/34; B60L 53/00; B60L 53/30; B60L 53/35–39; B60K 15/00; B60K 15/05; B60K 2015/0515; B60K 2015/0561; B60K 2015/0569; B60K 2015/0576; B60K 2015/0584
USPC .......................................................... 292/124
See application file for complete search history.

(56) References Cited

U.S. PATENT DOCUMENTS

2014/0084599 A1* 3/2014 Beck ................. E05C 19/022
  292/58
2015/0061314 A1* 3/2015 Beck ................. E05B 83/34
  296/97.22

FOREIGN PATENT DOCUMENTS

| DE | 102009060119 A1 | 6/2011 |
| DE | 102011101838 A1 | 11/2012 |
| DE | 102012004078 A1 | 9/2013 |
| WO | WO 2010058304 A1 | 5/2010 |
| WO | WO 2012158916 A1 | 11/2012 |

\* cited by examiner

ACTUATING MECHANISM TO ACTUATE A LOADING OR FUEL FILLER FLAP

The present invention relates generally to actuating apparatuses for opening and closing a cover in or on a vehicle. Specifically, the invention relates to actuating mechanisms for actuating a cover, in particular configured as a loading/charging flap or fueling flap, on a charging or fueling compartment that is received or receivable on or in a body component of a vehicle.

Furthermore, the invention relates to a corresponding system having a cover, in particular in the form of a charging or fueling flap and a charging or fueling compartment, which is received or receivable on or in a body component of a vehicle, wherein the cover (charging or fueling flap) is reversibly movable between a closed position and an open position relative to the charging or fueling compartment, and wherein the system comprises a corresponding actuating mechanism for actuating the cover i.e., charging or fueling flap.

Finally, the invention further relates to a vehicle having such a system.

The vehicle is in particular a vehicle having a hybrid or electric drive, wherein however vehicles having a purely combustion-based drive are not excluded in the context of the present invention.

BACKGROUND

Vehicles having a hybrid or electric drive have at least one battery or traction battery, which, for example in the case of PHEV vehicles (PHEV=plug-in hybrid electric vehicle) or BEV vehicles (BEV=battery electric vehicle), can be charged via an electrical charging port, which is accessible from the outside on the vehicle body and is typically a charging socket, by connecting to an electrical charging station, for example, or a conventional external electrical terminal.

The charging port is usually arranged in a charging compartment of the vehicle body, which is covered or closed by a charging flap or a charging closure element. A mechanism that cooperates with the charging flap or charging closure element selectively allows the charging compartment to be opened and closed or the charging flap or charging closure element to be flipped open and closed relative to the charging compartment, and thus allows access to the charging port.

In vehicles with a combustion-based drive, a fuel tank is supplied with fuel via a tank filler-neck, which is accessible from the outside by connection to a fuel pump or a fuel nozzle, for example. Like the charging port, the tank filler neck is typically arranged in a fueling compartment, which is associated with the vehicle body and is covered or closed by a fueling flap or a tank closure element. Here, too, a mechanism that cooperates with the fueling flap or tank closure element selectively allows the fueling compartment to be opened and closed or the fueling flap or tank closure element to be flipped open and closed relative to the fueling compartment, and thus allows access to the tank filler-neck.

The terms "fueling flap" and "fueling compartment" as used herein are not understood to mean only the components associated with a fuel tank or the components necessary for filling a fuel tank. Rather, these terms are also intended to include components for a tank for receiving other resources, for example AdBlue® or urea, or an additive such as water.

Accordingly, the invention also relates to actuating mechanisms for actuating charging or fueling flaps associated with a filling system for a resource or additive tank, in particular a fuel, AdBlue®, or water tank.

Actuating mechanisms and actuating apparatuses for opening and closing a cover in or on a vehicle are generally known from the prior art, for example from DE 10 2008 057 933 B4, DE 10 2009 060 119 A1, DE 10 2011 101 838 A1, and DE 10 2012 004 078 A1.

In the prior art, however, there is a fundamental need for charging and/or fueling compartment systems in which a plurality of functions must be switched and actuated in a coordinated manner. These functions include, in particular, the unlocking and locking or releasing and blocking of the cover or charging or fueling flap with the aid of a flap lock, moving the unlocked charging or fueling flap relative to the charging or fueling compartment such that the charging or fueling flap is transferable from a closed position into an open position (and vice versa), and other functions such as enabling and disabling a light source for illuminating at least one region of the charging or fueling compartment in its open state.

These different functions or functional components of the charging or fueling compartment system must be controlled or manipulated in coordination with respect to time. For example, during a charging operation, the charging or fueling flap is first to be unlocked in its closed position with the aid of the flap lock of the charging or fueling compartment system, wherein the charging or fueling flap can be moved relative to the charging or fueling compartment only after the unlocking of the charging or fueling flap in order to transfer it into the open state. Only then can the charging port or charging connector be connected and thereafter locked.

In order to manipulate and coordinate these functions or functional components, it is common to associate multiple actuators with the charging or fueling compartment system, wherein each actuator takes over the actuation of a correspondingly associated functional component, such as triggering the flap lock and moving the unlocked charging or fueling flap relative to the charging or fueling compartment. In order to coordinate the actuation of the various functional components of the charging or fueling compartment system, a control device is typically used, which triggers the respective actuators in a coordinated manner.

On the other hand, a relatively small amount of space is typically available in a vehicle for the integration of the charging or fueling compartment system. This limitation usually limits the number of implementable functions or functional components of a charging or fueling compartment system.

SUMMARY

Proceeding from the foregoing, the underlying problem of the invention is to further develop an actuating mechanism for the actuation of a charging or fueling flap on a charging or fueling compartment that is received or receivable on or in a body component of a vehicle in such a way that it has a relatively small construction space requirement, wherein at the same time a plurality of functions or functional components of the charging or fueling compartment system can be triggered in a reliable and coordinated manner. In addition, it is desired to reduce the manufacturing costs of the actuating mechanism despite its compact design.

Accordingly, the invention relates in particular to an actuating mechanism for actuating a charging or fueling flap on a charging or fueling compartment that is received or receivable on or in a body component of a vehicle, wherein the charging or fueling compartment is reversibly movable between a closed position and an open position relative to the charging or fueling compartment. The charging or fueling compartment is associated with a flap lock for locking the charging and/or fueling flap in its closed position.

The actuating mechanism comprises a drive having a drive shaft, which is operatively connectable to the charging or fueling flap such that, upon rotation of the drive shaft, the charging or fueling flap is movable relative to the charging or fueling compartment. The actuating mechanism according to the invention is in particular characterized in that it further comprises a mechanical control or switching mechanism, which is configured in such a way that, upon rotation of the drive shaft, a rotational movement of the drive shaft to manipulate the flap lock can be tapped with the aid of the mechanical control or switching mechanism.

The advantages achievable with the actuating mechanism according to the invention are obvious: in that a single drive element (drive), such as a single electromotive drive, can be provided in order to not only move the charging or fueling flap relative to the charging or fueling compartment as needed but also to manipulate further functions or functional components of the charging or fueling compartment system as needed, such as the flap lock in particular, the number of actuators to be provided in the overall charging or fueling compartment system can be reduced to a minimum. This results in a particularly inexpensive and compact design of the entire charging or fueling compartment system. At the same time, manufacturing costs can also be reduced while still ensuring extensive functionality of the charging or fueling compartment system.

Advantageously, the mechanical control or switching mechanism of the actuating mechanism according to the invention is further configured such that, when the rotational movement to manipulate the flap lock is tapped, an operative connection between the drive shaft and the charging or fueling flap is interrupted. In other words, the control or switching mechanism of the actuating mechanism according to the invention is configured in order to coordinate the manipulation of the further functional components, namely the manipulation of the flap lock, according to a predefined or definable event sequence, in particular with the movement of the charging or fueling flap relative to the charging or fueling compartment. In this way, it is ensured in particular that, during a charging or fueling operation, the flap lock is first manipulated such that the charging or fueling flap, which is still in its closed position, is unlocked accordingly.

Only after the charging or fueling flap has been unlocked is an operative connection established between the drive shaft of the drive and the charging or fueling flap, such that the charging or fueling flap is then moved relative to the charging or fueling compartment with the aid of the drive and is thus transferred from its closed position into its open position.

In this context, it is generally conceivable that the actuating mechanism can also manipulate other or further functional components in a coordinated manner, in particular with the movement of the charging or fueling flap relative to the charging or fueling compartment. In addition or as an alternative to the flap lock, this (further) functional component can be, for example, the release of a charging port, a charging connector, and/or a tank filler neck of the charging and/or fueling compartment system. Advantageously, such a charging port or charging connector or tank filler neck of the charging or fueling compartment system is only to be released after the charging or fueling flap has been moved into its open position.

For the realization of the coordinated manipulation of the at least one (further) functional component, such as the flap lock in particular, with the movement of the charging or fueling flap relative to the charging or fueling compartment, it is provided according to embodiments of the actuating mechanism according to the invention that the mechanical control or switching mechanism comprises a manual transmission, which is configured in order to interrupt the operative connection between the drive shaft and the charging or fueling flap as a function of an angle of rotation and/or as a function of a number of revolutions of the drive shaft of the drive.

According to conceivable realizations of such a manual transmission, it is provided that the manual transmission comprises at least a first gear that is operatively connected to the drive shaft and at least a second gear that is operatively connected to the charging or fueling flap, wherein the first and/or second gears has/have a tooth-free region, which is configured such that an engagement of the teeth of the first and second gears and thus an operative connection between the drive shaft and the charging or fueling flap is interrupted in the tooth-free region.

This is an easily realized solution for the manual transmission, which reliably controls the (non-uniform) sequence of movement for the opening of the charging or fueling flap upon rotation of the drive shaft. Of course, other solutions for the manual transmission are also possible.

In particular, the manual transmission is to be configured in order to interrupt the operative connection between the drive shaft and the charging or fueling flap when, and in particular only when, a rotational movement of the drive shaft to manipulate and in particular to unlock the flap lock is tapped with the aid of the mechanical control or switching mechanism, in order to thus coordinate the manipulation of the flap lock according to a predefined or definable event sequence, in particular with the movement of the charging or fueling flap relative to the charging or fueling compartment.

With respect to the flap lock, it is provided according to embodiments of the actuating mechanism according to the invention that said flap lock comprises a locking lever, in particular one that is biased, in particular spring-loaded, in the direction of a locked position, or a locking lever which is forcibly reset in the direction of a locked position, in particular with a slotted guide, which lever is mounted pivotably relative to the charging or fueling flap and relative to the charging or fueling compartment.

Various solutions are considered for manipulating the flap lock. For example, it is conceivable that the mechanical control or switching mechanism comprises a cam disk operatively connected to the drive shaft, which cam disk cooperates with the locking lever of the flap lock such that, when the cam disk is rotated via the biased or forcibly reset locking lever, a movement resulting from the rotation of the cam disk is tapped from its edge and is used in order to manipulate the flap lock, and in particular to pivot the locking lever.

As an alternative to a cam disk, however, it is also conceivable that the drive shaft is configured as a cam shaft having at least one cam region, which cam region cooperates with the locking lever of the flap lock such that, when the cam shaft is rotated via the biased or forcibly reset locking lever, a movement resulting from the rotation of the cam shaft is tapped from the cam region and is used in order to manipulate the flap lock, and in particular to pivot the locking lever.

Independently of the realization of the mechanism for the manipulation of the locking lever as needed, it is advantageous that the locking lever, which is biased and in particular spring-loaded, in the direction of a locked position is mounted pivotably such that, with the aid of the cam disk or the aid of the cam region, it is transferable into an unlocked position counter to the biasing, in which position a locking of the charging or fueling flap is lifted.

With respect to the mechanism for reversibly moving the charging or fueling flap between the closed position and the open position, it is provided according to embodiments of the present invention that the actuating mechanism comprises at least one first pivoting lever, which comprises a flap-side end region pivotably fastened to the charging or fueling flap and a body-side end region pivotably fastenable on the vehicle relative to the body component.

Here, the body-side end region of the at least one first pivoting lever can comprise a region serving as an output shaft, in particular a filler neck-shaped region, whose longitudinal and/or rotational axis corresponds to the pivot axis about which the body-side end region of the first pivoting lever is pivotably fastenable to the vehicle.

This is a particularly compact solution in order to produce the operative connection between the drive shaft of the preferably electromotive drive and the charging or fueling flap as needed, wherein however other solutions are of course also possible, in principle.

According to further developments of the last mentioned embodiments, it is provided that the at least one first pivoting lever is part of a mechanical linkage, which is connected to the charging or fueling flap in order to move the charging or fueling flap between the closed position and the open position.

Here, it is advantageous that the charging or fueling flap is at least partially received within the charging or fueling compartment in its closed position. Furthermore, it is advantageous that the charging or fueling flap is arranged preferably design-parallel to the vehicle body component in its open position.

In this advantageous realization, the charging or fueling flap in its open position abuts the vehicle body component and, in particular, no longer protrudes (perpendicularly) from the vehicle body component. This both reduces the contact surface for unintended touching and also reduces potential forces on the joints of the actuating mechanism, should any unintended touching occur.

"Design-parallel" is understood to mean that the charging or fueling flap and the vehicle body component are at least substantially parallel to one another when ignoring the curvatures and deviations from an ideal planar surface that arise due to the free form of the body component and the charging or fueling flap.

According to advantageous realizations of the invention, it is provided that the charging or fueling flap has an exterior facing away from the body component in the open position of the charging or fueling flap, wherein, in particular, the exterior of the charging or fueling flap faces away from the vehicle body component over the entire range of movement between the closed position and the open position. With this measure, the joints of the actuating mechanism, and in particular the mechanical linkage, are protected in the open state of the charging or fueling compartment. Furthermore, the space required to open the charging or fueling flap is reduced, since preferably the outside of the charging or fueling flap faces away from the vehicle body component over the entire range of motion between the closed position and the open position.

However, alternatively, it is also conceivable that the charging or fueling flap can be pivoted reversibly between the closed position and the open position by superposition of at least two circular rotational movements that occur at least temporarily simultaneously with different rotational radii, or at least one rotational movement that occurs at least temporarily simultaneously, and at least one linear movement.

In this embodiment, it is possible to implement a pivoting of the charging or tank flap with an extremely small installation space requirement by superposing or overlaying at least two movements, wherein, compared to conventional mechanisms, a significantly larger pivot angle of the charging or tank flap relative to the charging or filler neck housing is achieved with the same movement path traveled by the mechanism. In addition, after charging or refueling has been initiated, the mechanism allows the charging or fueling flap to pivot into a so-called weather protection position, so that a region between the charging or fueling compartment and the charging or fueling flap and any other components involved in charging or refueling are reliably protected against weather effects.

According to an advantageous further development of this aspect, it is provided that the mechanism is configured in order to simultaneously lift the charging or fueling flap from the charging or fueling compartment and rotate it in the direction of the body component while pivoting from the closed position into the open position.

The special mode of action of the mechanism can force the charging or fueling flap into its complex movement or pivoting pattern, as a result of which the increased pivot angle of the charging or fueling flap compared to conventional mechanisms is achieved. This movement or pivoting pattern of the charging or fueling flap is preferably achieved in that the mechanism superposes or overlays at least two circular rotational movements having different rotation radii via a special coupling to the charging or fueling compartment on the one side and the charging or fueling flap on the other side. The characteristic movement or pivoting pattern of the charging or fueling flap is characterized in that, on the one hand, the charging or fueling flap lifts up or away from the charging or fueling compartment (i.e., moves orthogonally away from a surface of a body component surrounding the charging or fueling compartment) and at the same time rotates in the direction of the body component (i.e., around an axis of rotation which extends parallel to the surface of the body component).

According to realizations of the mechanical linkage, it is provided that it comprises at least one second pivoting lever, which comprises a flap-side end region, with which it is pivotably fastened to the charging or fueling flap, and a body-side end region, with which it is pivotably fastenable on the vehicle relative to the body component. In this way, a four-link mechanical linkage is realized.

The second pivoting lever can be pivotable about a fixed pivot axis on the charging or fueling flap. For a particularly space-saving positioning of the charging or fueling flap in its open position, the at least one first pivoting lever and/or the at least one second pivoting lever is/are preferably designed to be curved.

The present invention further relates to a system having a charging or fueling flap and a charging or fueling compartment, which is received or receivable on or in a body component of a vehicle, wherein the charging or fueling flap is reversibly movable between a closed position and an open position relative to the charging or fueling compartment, and wherein the system further comprises an actuating mechanism of the aforementioned type according to the invention for actuating the charging or fueling flap.

The invention further relates to a vehicle having a vehicle body component and the aforementioned system according to the invention.

Here, it should be noted that the term "charging or fueling [flap]" as used herein also includes other covers for the closing of openings in the vehicle body in order to prevent soiling or misuse and in order to achieve a visually appealing overall image of the vehicle.

BRIEF DESCRIPTION OF THE DRAWINGS

An exemplary embodiment of the invention is described in further detail below, with reference to the accompanying drawings.

The following are shown.

DETAILED DESCRIPTION

Figure 1:
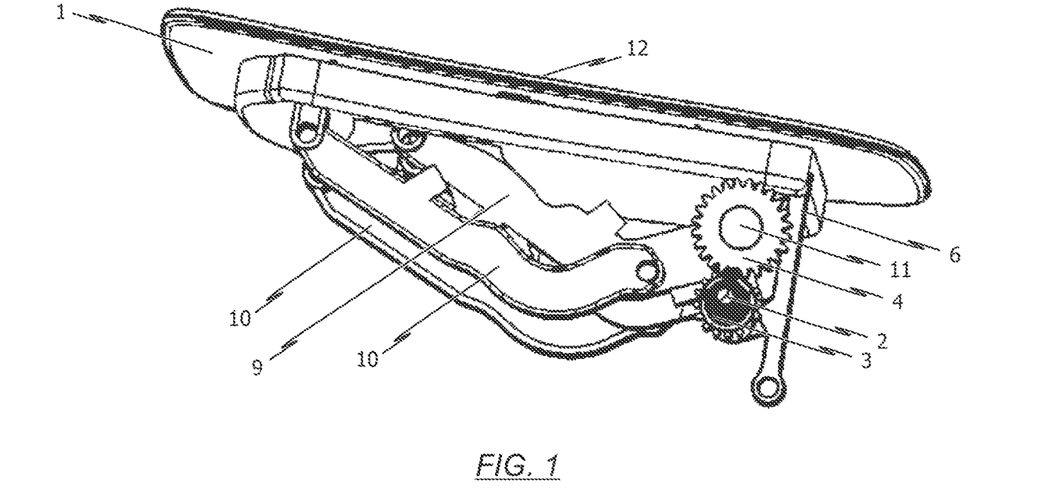
FIG. 1 schematically and in an isometric view, an exemplary embodiment of a charging or fueling flap system in a state in which the charging or fueling flap is in its locked, closed position.
Figure 2:
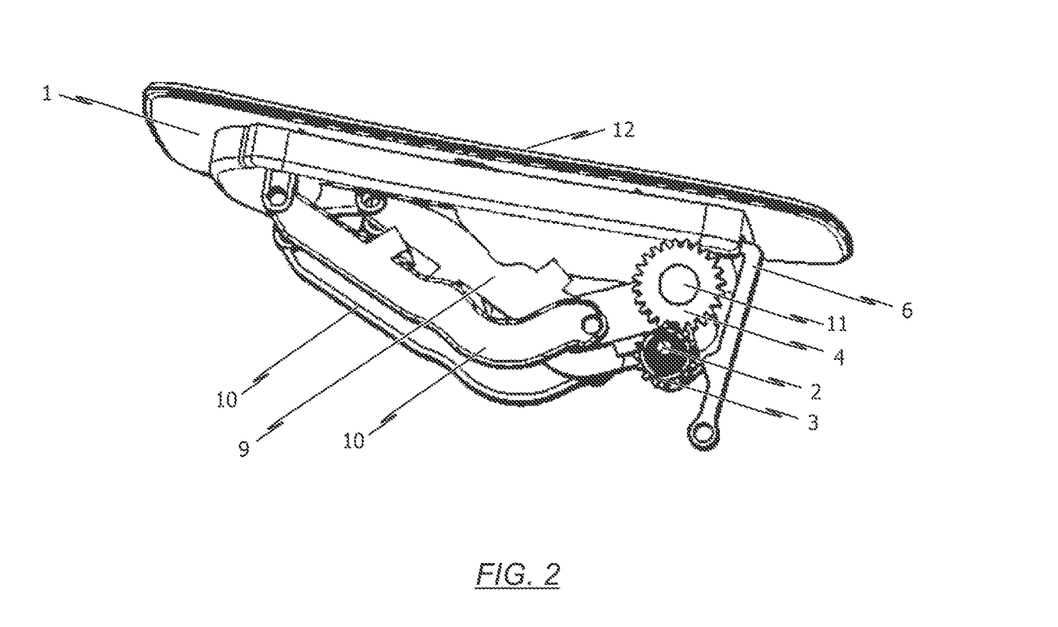
FIG. 2 schematically and in an isometric view, the exemplary embodiment of the charging or fueling flap system according to FIG. 1, namely in a state in which the charging or fueling flap is in the unlocked state between its closed position and its open position.
Figure 3:
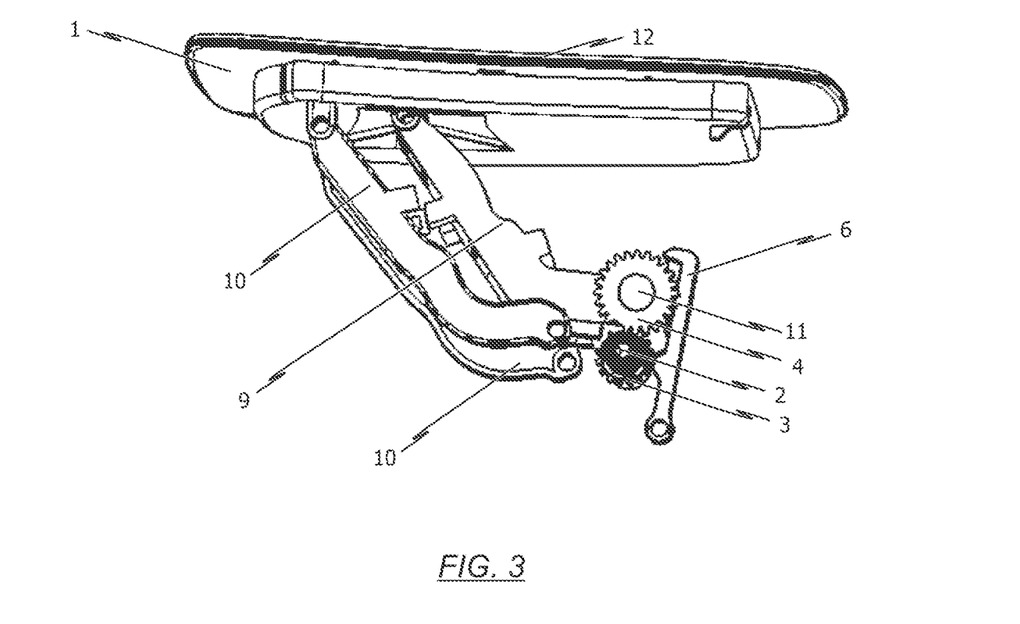
FIG. 3 schematically and in an isometric view, the exemplary embodiment of the charging or fueling flap system according to FIG. 1, namely in a state in which the charging or fueling flap is in the unlocked state in a position between the closed position and the open position.
Figure 4:
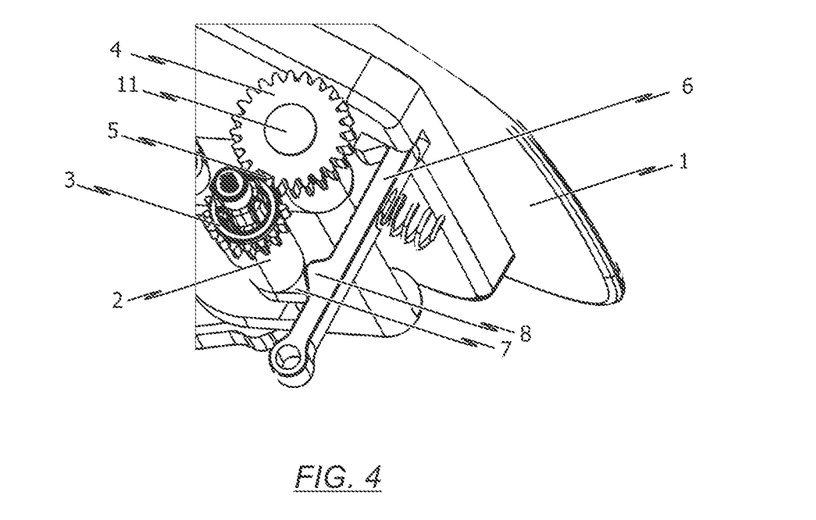
FIG. 4 schematically and in an isometric view, the actuating mechanism used by the charging or fueling flap system according to FIG. 1, namely in a state in which the charging or fueling flap is locked in its closed position.
Figure 5:
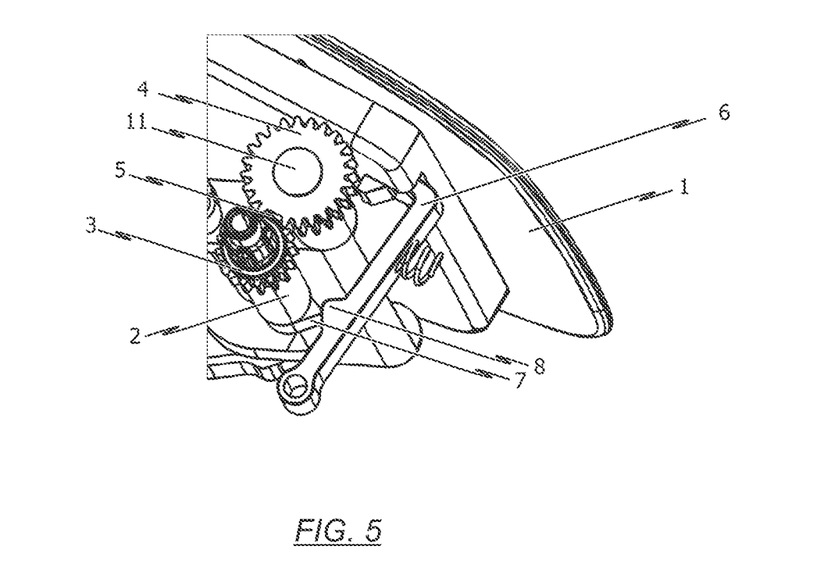
FIG. 5 schematically and in an isometric view, the actuating mechanism of the charging or fueling flap system according to FIG. 1, namely in a state in which the charging or fueling flap is unlocked in its closed position.
Figure 6:
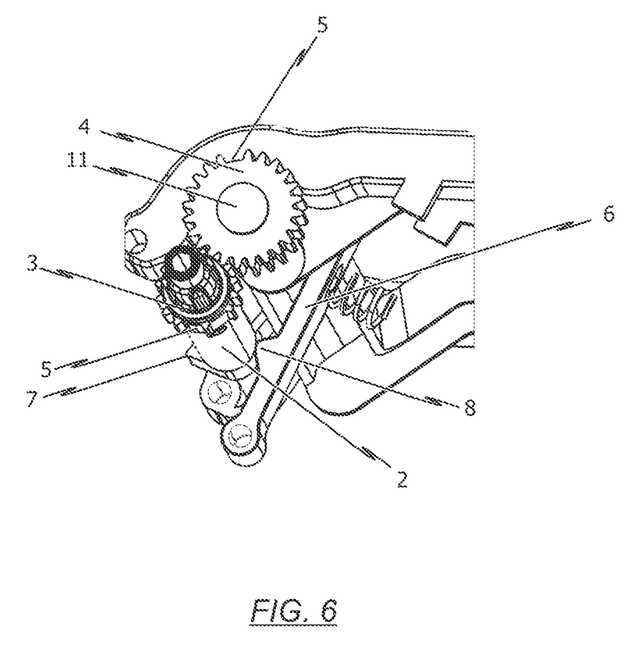
FIG. 6 schematically and in an isometric view, the actuating mechanism of the charging or fueling flap system according to FIG. 1, namely in a state in which the charging or fueling flap is unlocked in its open position.
Figure 7:
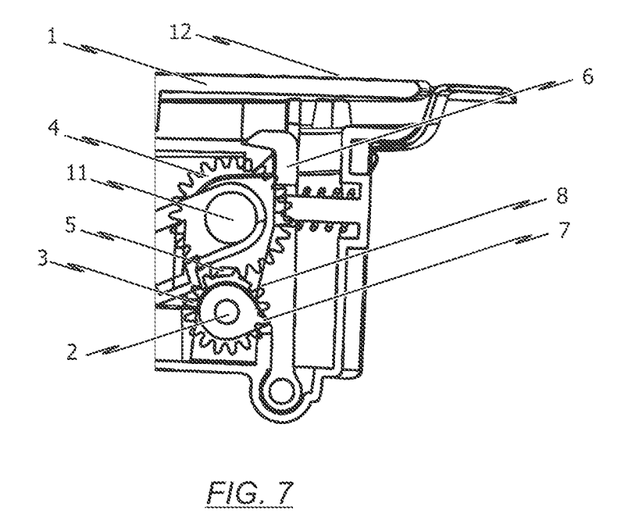
FIG. 7 schematically and in a top plan view, the actuating mechanism of the charging or fueling flap system according to FIG. 1, namely in a state in which the charging or fueling flap is locked in its closed position.
Figure 8:
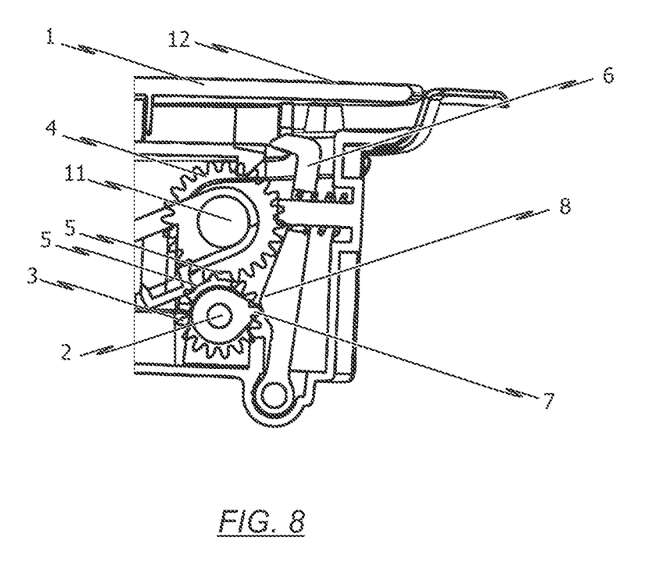
FIG. 8 schematically and in a top plan view, the actuating mechanism of the charging or fueling flap system according to FIG. 1, namely in a state in which the charging or fueling flap is unlocked in its closed position.
Figure 9:
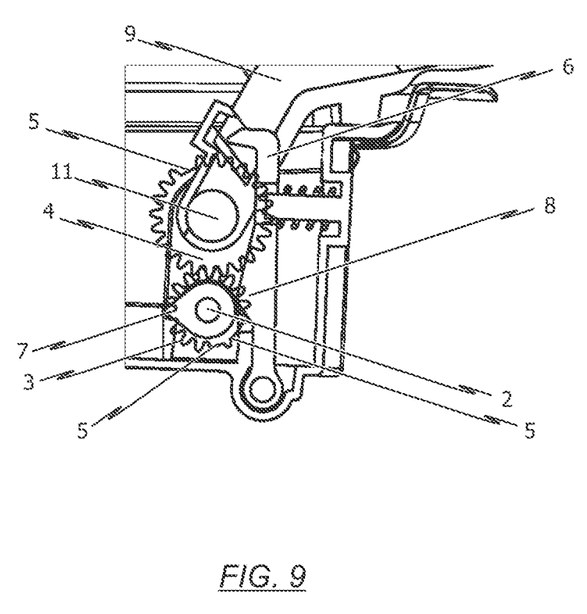
FIG. 9 schematically and in a top plan view, the actuating mechanism of the charging or fueling flap system according to FIG. 1, namely in a state in which the charging or fueling flap is unlocked in its open position.

With the aim of being able to manipulate a plurality of functions of a charging or fueling compartment system of a vehicle as needed and in particular in a coordinated manner (i.e., switching or actuating) in as compact a design as possible, an actuating mechanism is provided in the exemplary embodiment shown in the drawings, said actuating mechanism being configured in order to manipulate a flap lock 6 and move a charging or fueling flap 1 reversibly between a closed position and an open position relative to a charging or fueling compartment (not shown in the drawings) in a coordinated manner. The fueling compartment not shown in the drawings is, in particular, a charging or fueling compartment received or receivable on or in a body component of a vehicle.

The actuating mechanism comprises a drive not explicitly shown in the drawings, in particular an electromotive drive with which a drive shaft 2 is associated. The drive shaft 2 is operatively connectable to the charging or fueling flap 1 such that, when the drive shaft 2 rotates, the charging or fueling flap 1 is movable relative to the charging or fueling compartment.

In order to be able to coordinate the manipulation of the flap lock 6, which serves to lock the charging or fueling flap 1 in its closed position, with the movement of the charging or fueling flap 1 relative to the vehicle body component or the charging or fueling compartment, the actuating mechanism comprises a mechanical control or switching mechanism, which is configured such that, upon rotation of the drive shaft 2, a rotational movement of the drive shaft 2 can be tapped with the aid of the mechanical control or switching mechanism in order to manipulate the flap lock 6 accordingly.

The mechanical control or switching mechanism is further configured such that when the rotational movement is tapped, i.e., upon manipulation of the flap lock 6, an operative connection between the drive shaft 2 and the charging or fueling flap 1 is interrupted so that the charging or fueling flap 1 can then not be moved relative to the vehicle body or the charging or fueling compartment.

As will be explained in greater detail below, the mechanical control or switching mechanism comprises a manual transmission, which is configured in order to interrupt the operative connection between the drive shaft 2 and the charging or fueling flap 1 as a function of an angle of rotation and/or a number of revolutions.

Specifically, in the exemplary embodiment of the actuating mechanism according to the present invention as shown in the drawings, it is provided that the manual transmission comprises a first gear 3 that is operatively connected to the drive shaft 2 and a second gear 4 that is operatively connected to the charging or fueling flap 1, wherein the first and second gears 3, 4 each have a tooth-free region 5, which is configured such that an engagement of the teeth of the first and second gears 3, 4 and thus an operative connection between the drive shaft 2 and the charging or fueling flap 1 is interrupted in the tooth-free region 5.

Here, the tooth-free regions 5 of the first and second gears 3, 4 are selected such that the operative connection between the drive shaft 2 and the charging or fueling flap 1 is interrupted when, and in particular only when, a rotational movement of the drive shaft 2 to manipulate and in particular to unlock the flap lock 6 is tapped with the aid of the mechanical control or switching mechanism.

For this purpose, in the exemplary embodiment of the actuating mechanism according to the invention as shown in the drawings, it is provided that the flap lock 6 comprises a locking lever 6 that is biased or forcibly reset, in particular spring-loaded, in the direction of a locked position, which lever is mounted pivotably relative to the charging or fueling flap 1 (and relative to the charging or fueling compartment).

For the manipulation of the spring-loaded locking lever 6 of the flap lock 6 as needed, and in particular for the pivoting of the locking lever 6 in order to lift the locking of the charging or fueling flap 1, a special mechanism is used in the exemplary embodiment of the actuating mechanism according to the invention as shown in the drawings, with which mechanism a rotational movement of the drive shaft 2 is tapped and used for unlocking the flap lock 6.

Specifically, in the exemplary embodiment shown in the drawings, the drive shaft 2 is configured as a cam shaft having a cam region 7, which cooperates with the locking lever 6 or a corresponding cam region 8 of the locking lever 6 in such a way that, when the drive shaft 2 is rotated via the biased or forcibly reset locking lever 6, a movement resulting from the rotation of the drive shaft 2 is transferred from the cam region 7 to the locking lever 6 and in particular to the cam region 8 of the locking lever 6 used in order to pivot the locking lever 6.

Instead of such a cam shaft, it is also conceivable in principle to use a cam disk operatively connected to the drive shaft 2, which cam disk cooperates with the locking lever 6 such that, when the cam disk is rotated via the biased or forcibly reset locking lever 6, a movement resulting from the rotation of the cam disk is tapped from its edge and is used in order to manipulate the flap lock 6, i.e., to pivot the locking lever 6.

Here, it is provided that the locking lever 6, which is biased and in particular spring-loaded, in the direction of a locked position, is mounted pivotably such that, with the aid of the cam region 7 of the drive shaft 2, it is transferable into an unlocked position counter to the biasing, in which position a locking of the charging or fueling flap 1 is lifted.

The cam region 7 of the drive shaft 2 on the one hand and the tooth-free region 5 of the first and second gears 3, 4 on the other hand are selected such that, due to the tooth-free region 5, an engagement of the teeth of the first and second gears 3, 4 is not given when the cam region 7 of the drive shaft 2 cooperates with the locking lever 6.

For reversibly moving the charging or fueling flap 1 between the closed position and the open position, the actuating mechanism comprises at least one first pivoting lever 9 (in the drawings, two first pivoting levers 9), wherein the at least one first pivoting lever 9 comprises a flap-side end region pivotably fastened to the charging or fueling flap 1 and a body-side end region pivotably fastenable on the vehicle relative to the body component.

In the exemplary embodiment of the actuating mechanism shown in the drawings, it is provided here that the body-side end region of the at least one first pivoting lever 9 comprises a filler nozzle serving as an output shaft 11 whose longitudinal and/or rotational axis corresponds to the pivot axis about which the body-side end region of the first pivoting lever 9 is pivotably fastenable to the vehicle.

In particular, in the exemplary embodiment, it is provided that the two first pivoting levers 9 are parts of a mechanical linkage which is connected to the charging or fueling flap 1 in order to move the charging or fueling flap 1 between the closed position and the open position.

Specifically, a four-link mechanical linkage is used in the exemplary embodiment, because two second pivoting levers 10 are provided in addition to the two first pivoting levers 9.

The mechanical linkage is configured such that the charging or fueling flap 1 is preferably arranged at least in regions within the charging or fueling compartment in its closed position and design-parallel with respect to the vehicle body component in its open position.

The charging or fueling flap 1 has an exterior 12 that faces away from the vehicle body component in the open position of the charging or fueling flap 1. The exterior 12 of the charging or fueling flap 1 faces away from the vehicle body component over the entire range of motion between the closed position and the open position.

The invention is not limited to the exemplary embodiment shown in the drawings, but rather results when all of the features disclosed herein are considered together.

LIST OF REFERENCE NUMERALS

1 Charging or fueling flap
2 Drive shaft
3 First gear of the manual transmission
4 Second gear of the manual transmission
5 Tooth-free region
6 Locking lever/lock
7 Cam region of the drive shaft
8 Cam region of the locking lever
9 First pivoting lever of the mechanical linkage
10 Second pivoting lever of the mechanical linkage
11 Output shaft
12 Exterior of the fueling or charging flap

The invention claimed is:

1. An actuating mechanism for actuating a charging or fueling flap on a charging or fueling compartment received or receivable on or in a body component of a vehicle, wherein the charging or fueling flap is reversibly movable between a closed position and an open position relative to the charging or fueling compartment, wherein a flap lock is further provided for locking the charging or fueling flap in its closed position, and wherein the actuating mechanism comprises:
   a drive having a drive shaft, which is operatively connectable to the charging or fueling flap such that, upon rotation of the drive shaft, the charging or fueling flap is movable relative to the charging or fueling compartment; and
   a mechanical control or switching mechanism, which is configured such that, upon rotation of the drive shaft to manipulate the flap lock, a rotational movement of the drive shaft can be tapped with the aid of the mechanical control or switching mechanism;
   wherein the mechanical control or switching mechanism is further configured such that, when the rotational movement to manipulate the flap lock is tapped, an operative connection between the drive shaft and the charging or fueling flap is interrupted.

2. The actuating mechanism according to claim 1,
   wherein the flap lock comprises a locking lever, in particular one that is biased, in particular spring-loaded, in the direction of a locked position, or a locking lever which is forcibly reset in the direction of a locked position, in particular with a slotted guide, which lever is mounted pivotably relative to the charging or fueling flap and the charging or fueling compartment.

3. The actuating mechanism according to claim 2,
   wherein the mechanical control or switching mechanism comprises a cam disk operatively connected to the drive shaft, which cam disk cooperates with the locking lever of the flap lock such that, when the cam disk is rotated via the biased locking lever, a movement resulting from the rotation of the cam disk is tapped from its edge and is used in order to manipulate the flap lock and in particular to pivot the locking lever.

4. The actuating mechanism according to claim 2,
   wherein the drive shaft is configured as a cam shaft having at least one cam region, which cooperates with the locking lever such that, upon rotation of the drive shaft via the locking lever, a movement resulting from the rotation of the drive shaft is tapped from the cam region and used in order to manipulate the flap lock.

5. The actuating mechanism according to claim 2 wherein the locking lever, which is biased or forcibly reset in the direction of the locked position, is pivotably mounted such that it can be transferred into an unlocked position with the aid of the cam disk or the cam region counter to the biasing or forcible resetting, in which position a locking of the charging or fueling flap is lifted.

6. The actuating mechanism according to claim 1, wherein, for reversibly moving the charging or fueling flap between the closed position and the open position, the actuating mechanism comprises at least one first pivoting lever, which comprises a flap-side end region pivotably fastened to the charging or fueling flap and a body-side end region pivotably fastenable on the vehicle relative to the body component.

7. The actuating mechanism according to claim 6, wherein the body-side end region of the at least one first pivoting lever comprises a region serving as an output shaft, whose longitudinal and/or rotational axis corresponds to the pivot axis about which the body-side end region of the first pivoting lever is pivotably fastenable to the vehicle.

8. The actuating mechanism according to claim 6, wherein the at least one first pivoting lever is part of a mechanical linkage connected to the charging or fueling flap in order to move the charging or fueling flap between the closed position and the open position, wherein the charging or fueling flap is arranged within the charging or fueling compartment in its closed position and design-parallel to the vehicle body component or in a rotated state in its open position.

9. The actuating mechanism according to claim 8, wherein the charging or fueling flap comprises an exterior facing away from the vehicle body component in the open position of the charging or fueling flap, and wherein, in particular, the exterior of the charging or fueling flap faces away from the vehicle body component over the entire range of movement between the closed position and the open position.

10. The actuating mechanism according to claim 9, wherein the mechanical linkage comprises at least one second pivoting lever, which comprises a flap-side end region, with which it is pivotably fastened to the charging or fueling flap, and a body-side end region, with which it is pivotably fastenable on the vehicle relative to the body component.

11. A system having a charging or fueling flap and a charging or fueling compartment, which is received or receivable on or in a body component of a vehicle, wherein the charging or fueling flap is reversibly movable between a closed position and an open position relative to the charging or fueling compartment, and wherein the system further comprises an actuating mechanism according to claim 1 for actuating the charging or fueling flap.

12. The actuating mechanism according to claim 1, wherein the mechanical control or switching mechanism comprises a manual transmission, which is configured in order to interrupt the operative connection between the drive shaft and the charging or fueling flap as a function of an angle of rotation and/or a number of revolutions of the drive shaft.

13. The actuating mechanism according to claim 12, wherein the manual transmission comprises at least a first gear that is operatively connected to the drive shaft and at least a second gear that is operatively connected to the charging or fueling flap, wherein the first and/or second gears has/have a tooth-free region, which is configured such that an engagement of the teeth of the first and second gears and thus an operative connection between the drive shaft and the charging or fueling flap is interrupted in the tooth-free region.

14. The actuating mechanism according to claim 12, wherein the manual transmission is configured in order to interrupt the operative connection between the drive shaft and the charging or fueling flap when, and in particular only when, a rotational movement of the drive shaft to manipulate and in particular to unlock the flap lock is tapped with the aid of the mechanical control or switching mechanism.

15. An actuating mechanism for actuating a charging or fueling flap on a charging or fueling compartment received or receivable on or in a body component of a vehicle, wherein the charging or fueling flap is reversibly movable between a closed position and an open position relative to the charging or fueling compartment, wherein a flap lock is further provided for locking the charging or fueling flap in its closed position, and wherein the actuating mechanism comprises:
 a drive having a drive shaft, which is operatively connectable to the charging or fueling flap such that, upon rotation of the drive shaft, the charging or fueling flap is movable relative to the charging or fueling compartment; and
 a mechanical control or switching mechanism, which is configured such that, upon rotation of the drive shaft to manipulate the flap lock, a rotational movement of the drive shaft can be tapped with the aid of the mechanical control or switching mechanism;
 wherein the mechanical control or switching mechanism comprises a manual transmission, which is configured in order to interrupt the operative connection between the drive shaft and the charging or fueling flap as a function of an angle of rotation and/or a number of revolutions of the drive shaft.

16. An actuating mechanism for actuating a charging or fueling flap on a charging or fueling compartment received or receivable on or in a body component of a vehicle, wherein the charging or fueling flap is reversibly movable between a closed position and an open position relative to the charging or fueling compartment, wherein a flap lock is further provided for locking the charging or fueling flap in its closed position, and wherein the actuating mechanism comprises:
 a drive having a drive shaft, which is operatively connectable to the charging or fueling flap such that, upon rotation of the drive shaft, the charging or fueling flap is movable relative to the charging or fueling compartment; and
 a mechanical control or switching mechanism, which is configured such that, upon rotation of the drive shaft to manipulate the flap lock, a rotational movement of the drive shaft can be tapped with the aid of the mechanical control or switching mechanism;
 wherein, for reversibly moving the charging or fueling flap between the closed position and the open position, the actuating mechanism comprises at least one first pivoting lever, which comprises a flap-side end region pivotably fastened to the charging or fueling flap and a body-side end region pivotably fastenable on the vehicle relative to the body component.

* * * * *